(12) United States Patent
Ishikawa et al.

(10) Patent No.: US 7,290,647 B2
(45) Date of Patent: Nov. 6, 2007

(54) GUIDE APPARATUS

(75) Inventors: Hirokazu Ishikawa, Tokyo (JP); Kaoru Hoshide, Tokyo (JP); Takashi Ogata, Tokyo (JP); Shunji Matsutomi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 141 days.

(21) Appl. No.: 11/076,036

(22) Filed: Mar. 10, 2005

(65) Prior Publication Data

US 2006/0201782 A1  Sep. 14, 2006

(51) Int. Cl.
*F16C 29/06* (2006.01)
(52) U.S. Cl. .................. 198/750.1; 104/106; 104/119; 384/44; 384/45
(58) Field of Classification Search ............. 198/750.1; 384/44, 45; 104/106, 119
See application file for complete search history.

(56) References Cited

U.S. PATENT DOCUMENTS

| | | | | | |
|---|---|---|---|---|---|
| 4,582,369 | A | * | 4/1986 | Itoh | 384/13 |
| 4,743,124 | A | * | 5/1988 | Blaurock | 384/45 |
| 5,082,374 | A | * | 1/1992 | Narumiya | 384/45 |
| 5,584,581 | A | * | 12/1996 | Keller et al. | 384/45 |
| 5,845,996 | A | * | 12/1998 | Greubel et al. | 384/45 |
| 5,921,682 | A | * | 7/1999 | Kitade | 384/43 |
| 5,951,168 | A | * | 9/1999 | Teramachi et al. | 384/45 |
| 6,045,265 | A | * | 4/2000 | Shirai et al. | 384/45 |
| 6,231,238 | B1 | * | 5/2001 | Teramachi | 384/45 |
| 6,250,805 | B1 | * | 6/2001 | Kuwahara | 384/15 |
| 6,338,573 | B1 | * | 1/2002 | Michioka et al. | 384/45 |
| 6,412,983 | B1 | * | 7/2002 | Ishihara | 384/45 |
| 6,712,512 | B2 | * | 3/2004 | Teramach et al. | 384/45 |

FOREIGN PATENT DOCUMENTS

JP  57-82209  5/1980

(Continued)

OTHER PUBLICATIONS

International Search Report—International Application No. PCT/JP2005/005006 mailing date Jul. 12, 2005.

*Primary Examiner*—Douglas A Hess
(74) *Attorney, Agent, or Firm*—Westerman, Hattori, Daniels & Adrian, LLP.

(57) ABSTRACT

A guide apparatus has a standard end plate split into a pair of split parts that can be positioned with respect to each other with high accuracy and firmly secured to each axial end of a moving block body without fear of displacement during use. The guide apparatus has a moving block relatively movably attached to a track rail. The moving block body has in a section perpendicular to the axial direction a geometry that allows the moving block body to be assembled to the track rail at an intermediate part of the track rail. The end plate consists essentially of a pair of split parts that are splittable to right and left in the width direction of the end plate. One split part has a positioning pin projecting from a parting surface thereof. A positioning hole fittable with the positioning pin is provided in a parting surface of the other split part. The positioning pin is fitted into the positioning hole to form an end plate assembly. The end plate assembly is secured to one end of the moving block body in the direction of relative movement by using securing screws passed through securing screw holes provided in the split parts, respectively.

22 Claims, 18 Drawing Sheets

FOREIGN PATENT DOCUMENTS

| | | |
|---|---|---|
| JP | 58-142016 | 8/1983 |
| JP | 58-142017 | 8/1983 |
| JP | 61-97625 | 6/1986 |
| JP | 61-160060 | 10/1986 |
| JP | 62-101914 | 5/1987 |
| JP | 63-88928 | 6/1988 |
| JP | 64-27510 | 2/1989 |
| JP | 2-22407 | 2/1990 |
| JP | 2-80044 | 6/1990 |
| JP | 3-24511 | 3/1991 |
| JP | 5-8037 | 2/1993 |
| JP | 06-20921 | 3/1994 |
| JP | 8-21440 | 1/1996 |
| JP | 09-042284 | 2/1997 |
| JP | 09-042286 | 2/1997 |
| JP | 10-030638 | 2/1998 |
| JP | 2003-239452 | 8/2003 |
| JP | 3101882 | 3/2004 |

* cited by examiner

GUIDE APPARATUS

BACKGROUND OF THE INVENTION

The present invention relates to a guide apparatus having a track rail and a moving block relatively movably attached to the track rail with a plurality of rolling elements (balls or rollers) interposed therebetween. More particularly, the present invention relates to a guide apparatus suitable for use in a case where a moving block is assembled to a track rail having an endless annular shape or to a track rail having a rolling element rolling surface that turns uphill at both ends thereof.

It should be noted that the term "relatively movable" as used herein means that the moving block and the track rail are movable relative to each other, such as in a case where the track rail is fixed, and the moving block is movable, and in a case where the moving block is fixed, and the track rail is movable.

There is a guide apparatus having a moving block relatively movably attached to a track rail with a multiplicity of rolling elements interposed therebetween.

In such a guide apparatus, conventionally, the moving block cannot be assembled onto the track rail from thereabove (so that the moving block is mounted astride the track rail). Therefore, the moving block is assembled onto the track rail from an end of the rail.

In a case where the track rail is formed in an endless annular shape, or in a case where the track rail has a rolling element rolling surface that turns uphill at both ends thereof, however, the moving block cannot be assembled to the track rail from an end of the rail.

Accordingly, the conventional practice is to form an intermediate portion of a predetermined length of the track rail as a separate removable part. When the moving block is to be assembled to the track rail, the removable part portion is removed from the track rail, and the moving block is assembled to the track rail from an end of an intermediate part of the track rail from which the removable part portion has been removed. Thereafter, the removable part portion is returned to the previous position and secured to the track rail.

It is also conceivable to arrange the moving block body so that it can be assembled to the track rail from thereabove, and to split each end plate into a pair of split parts in a width direction (i.e. a direction perpendicular to the direction of travel) as disclosed in Japanese Patent Application Unexamined Publication (KOKAI) No. Sho 58-142017. In assembly process, after the moving block body has been assembled to the track rail, an end plate formed from a pair of split parts is secured to each end of the moving block body in the travel direction. With this arrangement, the moving block can be assembled to the track rail even if it has an endless annular shape or it has a rolling element rolling surface that turns uphill at both ends thereof.

Japanese Patent Application Unexamined Publication (KOKAI) No. Hei 8-21440 discloses a guide apparatus including a moving block having a special structure so that the moving block can be attached to and detached from an endless annular track rail sideways.

According to the first-mentioned conventional method, each end plate is split into a pair of split parts in the width direction, and after the moving block body has been assembled to the track rail, an end plate formed from a pair of split parts is secured to each end of the moving block body in the travel direction, as disclosed in Japanese Patent Application Unexamined Publication (KOKAI) No. Sho 58-142017. This method has the problem that it is difficult or impossible to position the split parts of the end plate with respect to each other with high accuracy. Even if the end plate split parts have been positioned with respect to each other accurately, displacement is likely to occur during use.

The guide apparatus disclosed in Japanese Patent Application Unexamined Publication (KOKAI) No. Hei 8-21440 needs to use a moving block body and end plates having special structures in order to allow the moving block to be attached to and detached from the track rail sideways. Conventional standard moving block body and end plates cannot be used in the prior art apparatus.

SUMMARY OF THE INVENTION

An object of the present invention is to eliminate the above-described problems with the prior art and to provide a guide apparatus using a standard end plate split into a pair of split parts that can be positioned with respect to each other with high accuracy and firmly secured to each axial end of a moving block body without fear of displacement during use.

To attain the above-described object, the present invention is applied to a guide apparatus including a track rail having a longitudinally extending rolling element rolling surface. A moving block is relatively movably attached to the track rail. The moving block has a moving block body with a load rolling element rolling surface that forms a load rolling element rolling passage in cooperation with the rolling element rolling surface. The moving block body further has a rolling element relief bore associated with the load rolling element rolling surface. An end plate is attached to each end of the moving block body in the direction of relative movement of the moving block. The end plate has a rolling element direction change passage that forms a rolling element recirculation passage in cooperation with the load rolling element rolling passage and the rolling element relief bore. A plurality of rolling elements are disposed in the rolling element recirculation passage so as to recirculate in response to the relative movement of the track rail and the moving block. According to a first feature of the present invention, the moving block body has in a section perpendicular to the axial direction a geometry that allows the moving block body to be assembled to the track rail at an intermediate part of the track rail. The end plate consists essentially of a pair of split parts that are splittable to right and left in the width direction of the end plate. The split parts of the end plate are connected to each other into an end plate assembly with a high positioning accuracy by a connecting mechanism. The end plate assembly is secured to one end of the moving block body in the direction of relative movement by a securing mechanism.

According to a second feature of the present invention, the connecting mechanism in the guide apparatus according to the first feature of the present invention includes a positioning pin projecting from a parting surface of one split part of the end plate. A positioning hole fittable with the positioning pin is provided in a parting surface of the other split part. The positioning pin is fitted into the positioning hole to form the end plate assembly. The securing mechanism includes securing screws and securing screw holes respectively provided in the split parts of the end plate. The securing screws are passed through the securing screw holes to secure the end plate assembly to one end of the moving block body in the direction of relative movement.

According to a third feature of the present invention, the connecting mechanism in the guide apparatus according to the first feature of the present invention includes positioning holes provided in the split parts of the end plate at respective positions a predetermined distance away from respective parting surfaces of the split parts. The connecting mechanism further includes a positioning member bent at both ends thereof into a U-shape so that both end portions of the positioning member are fittable into the positioning holes, respectively. The split parts are brought into contact with each other so that the parting surfaces coincide with each other, and both end portions of the positioning member are fitted into the respective positioning holes of the split parts to form the end plate assembly. The securing mechanism includes securing screws and securing screw holes respectively provided in the split parts of the end plate. The securing screws are passed through the securing screw holes to secure the end plate assembly to one end of the moving block body in the direction of relative movement.

According to a fourth feature of the present invention, the connecting mechanism in the guide apparatus according to the first feature of the present invention includes a retaining member bent at both ends thereof into a U-shape. The split parts are brought into contact with each other so that parting surfaces of the split parts coincide with each other. In this state, the split parts are fitted between the opposite end portions of the retaining member to form the end plate assembly. The securing mechanism includes securing screws and securing screw holes respectively provided in the split parts of the end plate. The securing screws are passed through the securing screw holes to secure the end plate assembly to one end of the moving block body in the direction of relative movement.

According to a fifth feature of the present invention, the connecting mechanism in the guide apparatus according to the first feature of the present invention includes a recess and a projection provided on respective parting surfaces of the split parts of the end plate. The recess and the projection are fittable to each other to prevent the split parts from moving relative to each other in the width direction. The split parts are joined together so that the parting surfaces coincide with each other and the recess and the projection are fitted to each other, thereby forming the end plate assembly. The securing mechanism includes securing screws and securing screw holes respectively provided in the split parts of the end plate. The securing screws are passed through the securing screw holes to secure the end plate assembly to one end of the moving block body in the direction of relative movement.

According to a sixth feature of the present invention, the connecting mechanism in the guide apparatus according to the first feature of the present invention includes a blank plug provided in one of the split parts of the end plate such that a part of the blank plug projects from a parting surface of the one of the split parts. A recess fittable with the projecting part of the blank plug is provided in a parting surface of the other of the split parts. The split parts are joined together so that the parting surfaces coincide with each other and the projecting part of the blank plug is fitted into the recess, thereby forming the end plate assembly. The securing mechanism includes securing screws and securing screw holes respectively provided in the split parts of the end plate. The securing screws are passed through the securing screw holes to secure the end plate assembly to one end of the moving block body in the direction of relative movement.

According to a seventh feature of the present invention, the end plate in the guide apparatus according to the first feature of the present invention has an approximately U-shaped configuration in a section perpendicular to the axial direction and is assembled astride the track rail. The connecting mechanism is arranged such that the split parts are partly connected to each other at a joint. In assembly process, the split parts are rotated about the joint so as to enlarge the opening of the end plate in the width direction. In this state, the end plate is assembled astride the track rail to form the end plate assembly. The securing mechanism includes securing screws and securing screw holes respectively provided in the split parts of the end plate. The securing screws are passed through the securing screw holes to secure the end plate assembly to one end of the moving block body in the direction of relative movement.

According to an eighth feature of the present invention, the track rail in the guide apparatus according to any of the first to seventh features of the present invention has an endless annular shape.

According to a ninth feature of the present invention, the track rail in any of the first to seventh features of the present invention has the rolling element rolling surface that turns uphill at both ends thereof.

In addition, the present invention is applied to a guide apparatus including a track rail having a longitudinally extending rolling element rolling surface. A moving block is relatively movably attached to the track rail. The moving block has a moving block body with a load rolling element rolling surface that forms a load rolling element rolling passage in cooperation with the rolling element rolling surface. The moving block body further has a rolling element relief bore associated with the load rolling element rolling surface. An end plate is attached to each end of the moving block body in the direction of relative movement of the moving block. The end plate has a rolling element direction change passage that forms a rolling element recirculation passage in cooperation with the load rolling element rolling passage and the rolling element relief bore. A plurality of rolling elements are disposed in the rolling element recirculation passage so as to recirculate in response to the relative movement of the track rail and the moving block. According to a tenth feature of the present invention, the moving block body has in a section perpendicular to the axial direction a geometry that allows the moving block body to be assembled to the track rail at an intermediate part of the track rail. The end plate has an approximately U-shaped configuration in a section perpendicular to the axial direction and is assembled astride the track rail. The end plate is formed from an elastic material so that the width of the opening of the end plate is expandable by elastic deformation to allow the end plate to be assembled onto the track rail. The end plate assembled onto the track rail is secured to one end of the moving block body in the direction of relative movement by a securing mechanism.

According to the first to ninth features of the present invention, each end plate is formed from a pair of split parts splittable to right and left in the width direction. Therefore, the end plate need not be assembled to the track rail from one end of the track rail but can be easily assembled thereto sideways at an intermediate part of the track rail. Moreover, because the split parts of the end plate are secured to one end of the moving block body after the split parts have been positioned with respect to each other with high accuracy, the split parts can be mounted without fear of displacement during use. Accordingly, the moving block can be easily assembled to the track rail at an intermediate part thereof even if the track rail has an endless annular shape, or if the track rail has a rolling element rolling surface that turns uphill at both ends thereof, or, further, if it is difficult to assemble the moving block to the track rail from an end thereof owing to an obstacle or the like.

According to the tenth feature of the present invention, the end plate is formed from an elastic material so that the width of the opening of the end plate is expandable by elastic deformation to allow the end plate to be assembled onto the track rail. Therefore, the end plate is simple in structure and easy to assemble onto the track rail. Accordingly, the moving block can be easily assembled to the track rail at an intermediate part thereof even if the track rail has an endless annular shape, or if the track rail has a rolling element rolling surface that turns uphill at both ends thereof, or, further, if it is difficult to assemble the moving block to the track rail from an end thereof owing to an obstacle or the like, as in the case of the above.

DESCRIPTION OF THE PREFERRED EMBODIMENTS

Figure 1:
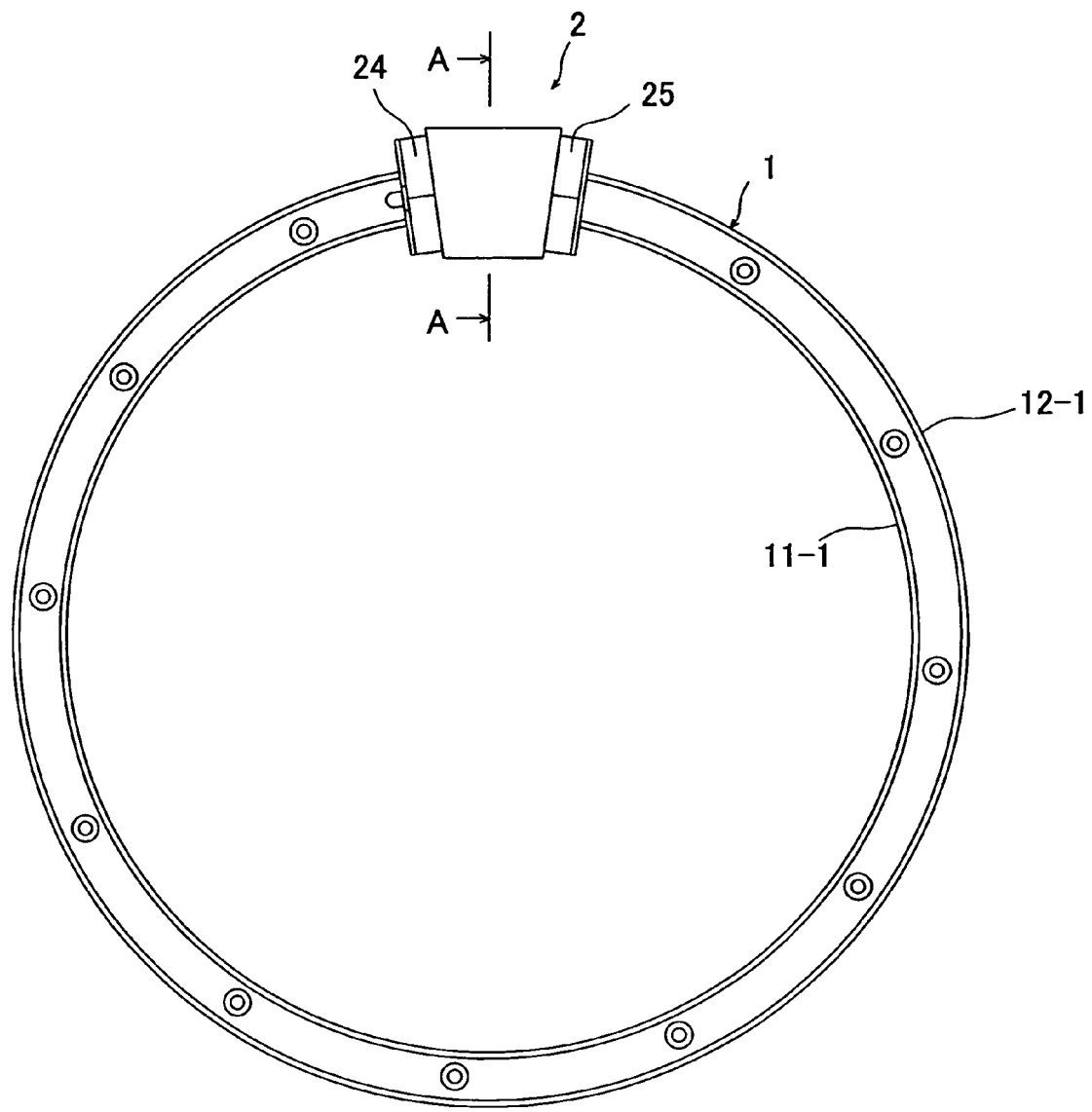
FIG. 1 is a plan view showing a structural example of the guide apparatus according to the present invention.
Figure 2:
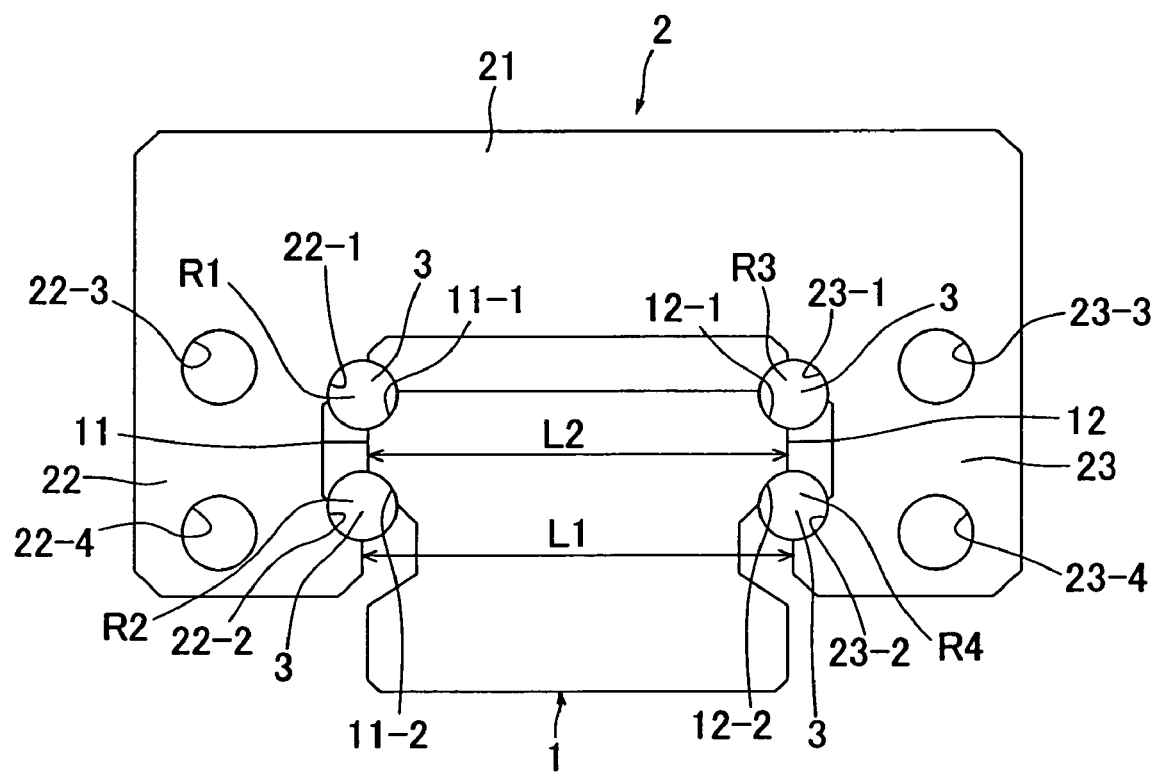
FIG. 2 is a sectional view taken along the line A-A in FIG. 1.
Figure 3:
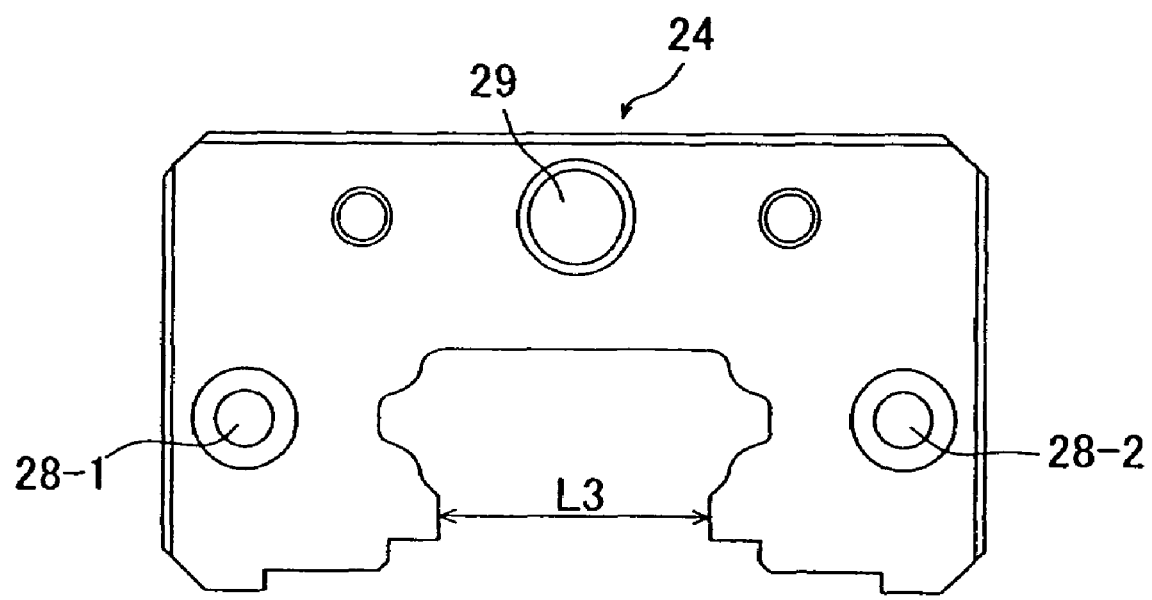
FIG. 3 is a diagram showing a structural example of a conventional end plate.
Figure 4:
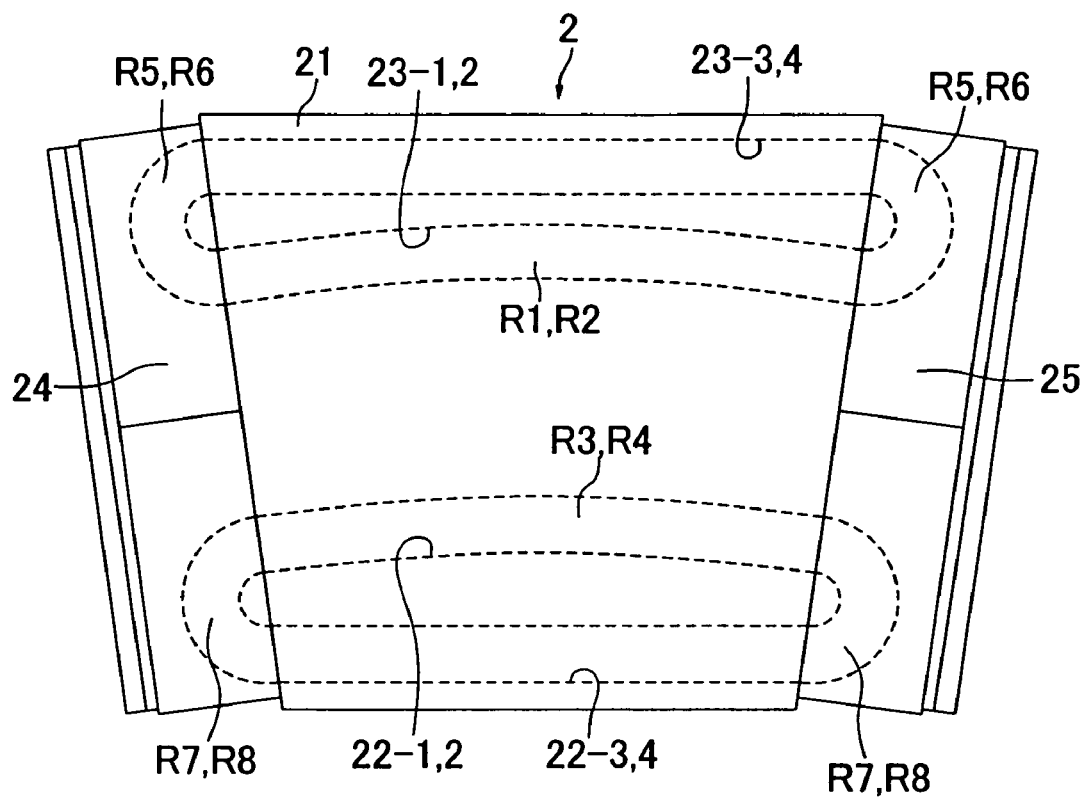
FIG. 4 is a diagram showing a structural example of a moving block of the guide apparatus according to the present invention.

Embodiments of the present invention will be described below with reference to the accompanying drawings. FIGS. 1 to 4 show the structure of a guide apparatus according to the present invention. FIG. 1 is a plan view. FIG. 2 is a sectional view taken along the line A-A in FIG. 1. FIG. 3 is a front view of a conventional end plate. FIG. 4 is a plan view of a moving block. As shown in the figures, the guide apparatus according to the present invention has an endless annular track rail 1 and a moving block 2 movably attached thereto.

The track rail 1 is approximately rectangular in a section perpendicular to the axial direction (i.e. the travel direction of the moving block 2). The track rail 1 has recesses in the respective centers of the left and right sides thereof. The track rail 1 has ridges 11 and 12 on the left and right sides of the top thereof.

Rolling element rolling grooves 11-1 and 11-2 along which rolling elements (balls in the illustrated example) roll are formed on the upper and lower corners of the ridge 11, and rolling element rolling grooves 12-1 and 12-2 are formed on the upper and lower corners of the ridge 12.

The moving block 2 has a moving block body 21 with a U-shaped sectional configuration as a main body thereof. The moving block body 21 has skirt portions 22 and 23 formed on the left and right sides thereof. The skirt portions 22 and 23 face each other across the opening of the U-shaped moving block body 21.

The width L1 of the opening of the moving block body 21 (i.e. the spacing between the mutually opposing inner surfaces of the skirt portions 22 and 23) is larger than the width L2 between the respective distal ends of the ridges 11 and 12 of the track rail 1 (L1>L2). That is, the moving block body 21 can be assembled onto the track rail 1 from thereabove (or sideways).

The inner surface of the skirt portion 22 of the moving block body 21 is provided with axial load rolling element rolling grooves 22-1 and 22-2 facing opposite the rolling element rolling grooves 11-1 and 11-2 of the track rail 1. The inner surface of the skirt portion 23 is provided with axial load rolling element rolling grooves 23-1 and 23-2 facing opposite the rolling element rolling grooves 12-1 and 12-2 of the track rail 1.

In addition, the skirt portion 22 is provided with rolling element relief bores 22-3 and 22-4 respectively associated with the load rolling element rolling grooves 22-1 and 22-2. The skirt portion 23 is provided with rolling element relief bores 23-3 and 23-4 respectively associated with the load rolling element rolling grooves 23-1 and 23-2.

The rolling element rolling grooves 11-1 and 11-2 of the track rail 1 and the load rolling element rolling grooves 22-1 and 22-2 of the moving block body 21 form load rolling element rolling passages R1 and R2, respectively. The rolling element rolling grooves 12-1 and 12-2 of the track rail 1 and the load rolling element rolling grooves 23-1 and 23-2 of the moving block body 21 form load rolling element rolling passages R3 and R4, respectively.

End plates 24 and 25 are provided at both ends of the moving block body 21 in the travel direction (axial direction) thereof. The end plates 24 and 25 are each provided with direction change passages R5 and R6 for moving rolling elements (balls) 3 in the load rolling element rolling passages R1 and R2 into the rolling element relief bores 22-3 and 22-4 or moving them in the opposite direction and further provided with direction change passages R7 and R8 for moving rolling elements (balls) 3 in the load rolling element rolling passages R3 and R4 into the rolling element relief bores 23-3 and 23-4 or moving them in the opposite direction.

That is, as the moving block 2 moves, a multiplicity of rolling elements (balls) 3 roll and recirculate through rolling element recirculation passages (there are four rolling element recirculation passages in the illustrated example) respectively formed from the load rolling element rolling passages R1, R2, R3 and R4, the rolling element relief bores 22-3, 22-4, 23-3 and 23-4 and the direction change passages R5, R6, R7 and R8.

As stated above, the width L1 of the opening of the moving block body 21 is larger than the width L2 between the distal ends of the ridges 11 and 12 of the track rail 1 (L1>L2), and hence the moving block body 21 can be assembled onto the track rail 1 from thereabove (or sideways). Accordingly, even if the track rail 1 has an endless annular shape, it is easy to assemble the moving block body 21 onto the track rail 1.

In contrast, the end plates 24 and 25 generally have a configuration as shown in FIG. 3. That is, the width L3 of the opening of the end plate 24 (25) is smaller than the width L2 between the distal ends of the ridges 11 and 12 of the track rail 1 (L2>L3). Therefore, the end plates 24 and 25 cannot be assembled onto the track rail 1 from thereabove (or sideways).

Under these circumstances, the present invention made the following improvements to the end plates 24 and 25 so that they can be assembled onto the track rail 1 from thereabove. It should be noted that the following description is made of the end plate 24, but the same is the case with the end plate 25.

First Embodiment

Figure 5A:
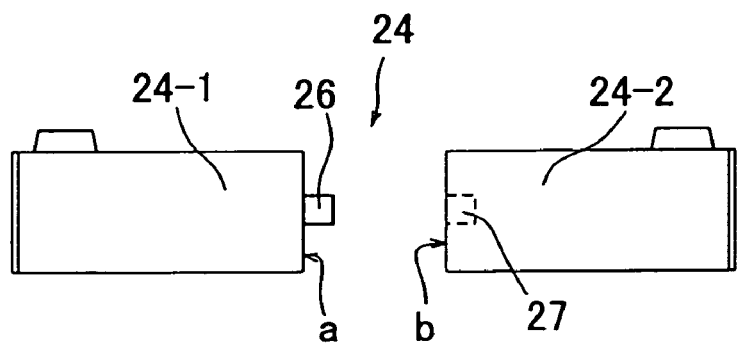
FIGS. 5A, 5B and 5C are diagrams showing a structural example of a moving block end plate of the guide apparatus according to the present invention (first embodiment).
Figure 5B:
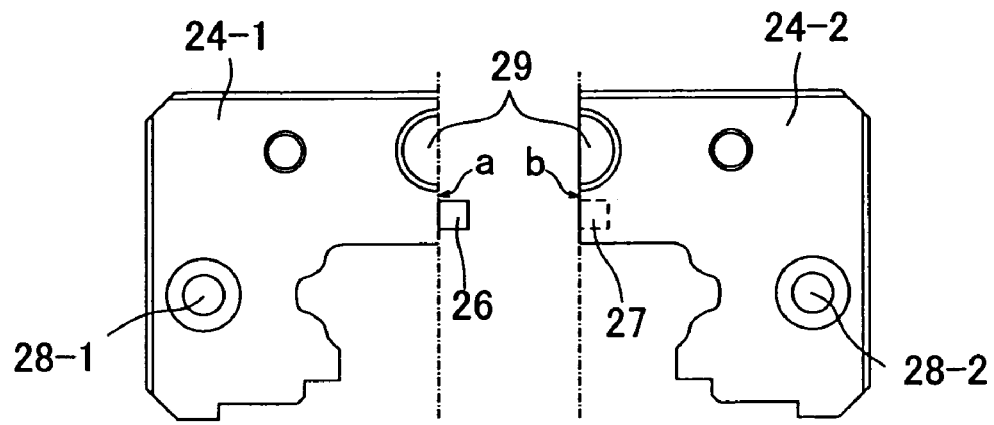
Figure 5C:
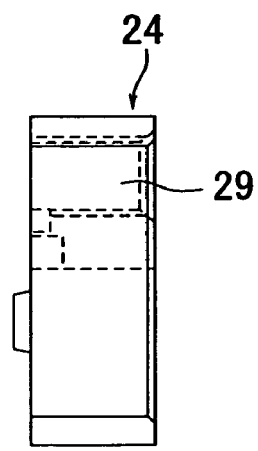

FIGS. 5A, 5B and 5C show a structural example of the end plate 24. FIG. 5A is an exploded plan view. FIG. 5B is an exploded front view. FIG. 5C is a side view. In these figures, the same reference numerals as those in FIGS. 1 to 4 denote the same or corresponding portions. The same shall apply in the other drawings.

As shown in FIGS. 5A, 5B and 5C, the end plate 24 has an approximately U-shaped configuration in a front view. The end plate 24 is formed from a pair of split parts 24-1 and 24-2 that are splittable to left and right in the width direction at the opening of the end plate 24.

One split part 24-1 of the end plate 24 has a positioning pin 26 projecting from a parting surface a thereof. A positioning hole 27 fittable with the positioning pin 26 is provided in a parting surface b of the other split part 24-2. Further, securing screw holes 28-1 and 28-2 are provided in the split parts 24-1 and 24-2, respectively.

The two split parts 24-1 and 24-2 are brought toward each other from both sides of the track rail 1 so that the parting surfaces a and b approach each other. Then, the positioning pin 26 is fitted into the positioning hole 27, and the parting surfaces a and b are brought into coincidence with each other, thereby forming an end plate assembly.

Next, the end plate assembly is secured to one end of the moving block body 21 by using securing pins passed through the securing screw holes 28-1 and 28-2 of the split parts 24-1 and 24-2. It should be noted that reference numeral 29 denotes an oil hole.

As stated above, the split parts 24-1 and 24-2, which constitute the end plate 24, are brought toward each other from both sides of the track rail 1. Then, the positioning pin 26 is fitted into the positioning hole 27, and the parting surfaces a and b are brought into coincidence with each other to form an end plate assembly. Accordingly, the split parts 24-1 and 24-2 can be positioned with respect to each other with high accuracy. Further, the end plate assembly is secured to one end of the moving block body 21 by using securing screws passed through the securing screw holes 28-1 and 28-2. Thus, the split parts 24-1 and 24-2 can be positioned and secured with high accuracy, and no displacement will occur during use.

Second Embodiment

Figure 6A:
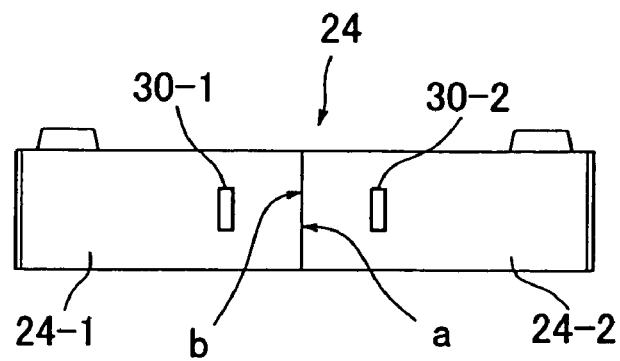
FIGS. 6A, 6B, 6C, 6D and 6E are diagrams showing another structural example of the moving block end plate of the guide apparatus according to the present invention (second embodiment).
Figure 6B:
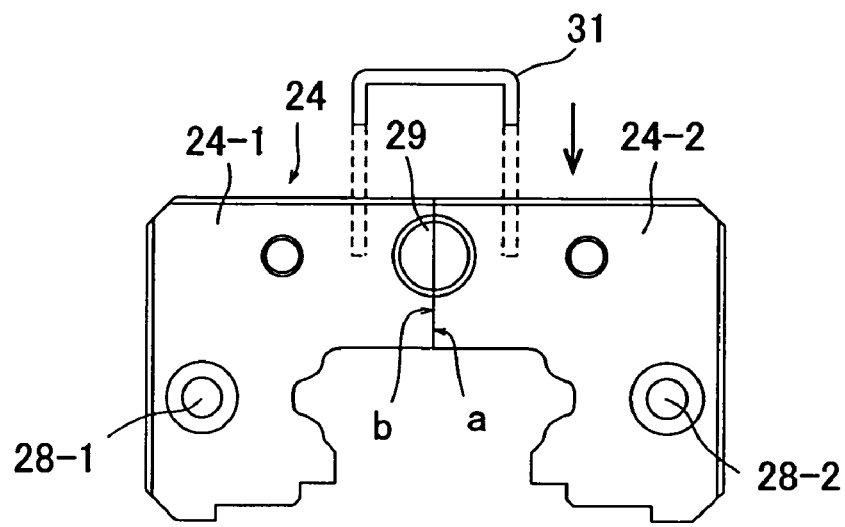
Figure 6C:
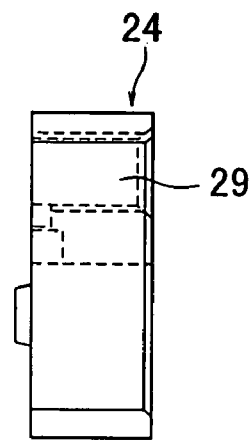
Figure 6D:
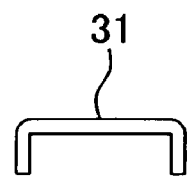
Figure 6E:
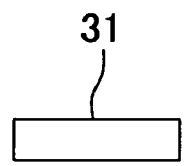

FIGS. 6A, 6B, 6C, 6D and 6E show another structural example of the end plate 24. FIG. 6A is a plan view. FIG. 6B is a front view. FIG. 6C is a side view. FIG. 6D is a front view of a positioning member. FIG. 6E is a plan view of the positioning member.

The end plate 24 is formed from a pair of split parts 24-1 and 24-2 that are splittable to left and right in the width direction at the opening of the end plate 24. The respective tops of the split parts 24-1 and 24-2 are provided with positioning holes 30-1 and 30-2 at respective positions a predetermined distance away from parting surfaces a and b. In addition, the split parts 24-1 and 24-2 are provided with respective securing screw holes 28-1 and 28-2.

A positioning member 31 is made from a metal plate or the like. The positioning member 31 is bent at both ends thereof into a U-shape in a front view so that the end portions of the positioning member 31 can be fitted into the positioning holes 30-1 and 30-2, respectively.

The split parts 24-1 and 24-2 are brought toward each other from both sides of the track rail 1 until the parting surfaces a and b coincide with each other. In this state, the bent end portions of the positioning member 31 are fitted into the positioning holes 30-1 and 30-2 to form an end plate assembly.

Thereafter, the end plate assembly is secured to one end of the moving block body 21 by using securing screws passed through the securing screw holes 28-1 and 28-2.

Thus, the split parts 24-1 and 24-2 are positioned with respect to each other with high accuracy, and in this state the end plate assembly is secured to one end of the moving block body 21. Therefore, no displacement will occur during use, as in the case of the first embodiment.

In this embodiment, the positioning holes 30-1 and 30-2 are provided on the respective tops of the split parts 24-1 and 24-2, and the positioning member 31 is fitted into the positioning holes 30-1 and 30-2 from thereabove. The arrangement may, however, be such that the positioning holes 30-1 and 30-2 are provided on the respective sides of the split parts 24-1 and 24-2, and the positioning member 31 is fitted into the positioning holes 30-1 and 30-2 from sideward directions.

Third Embodiment

Figure 7A:
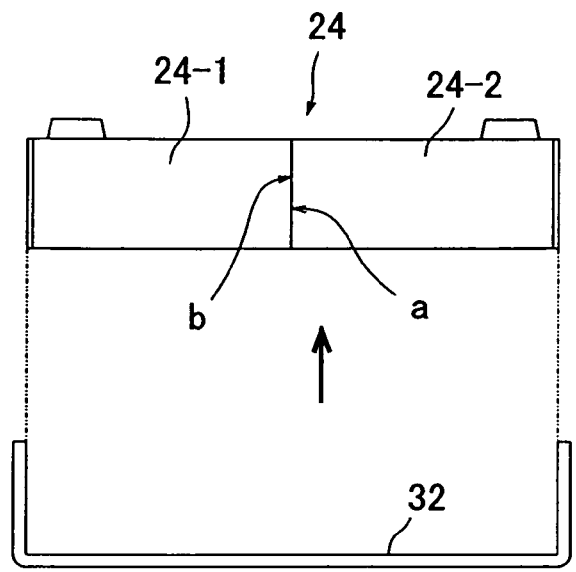
FIGS. 7A, 7B, 7C and 7D are diagrams showing still another structural example of the moving block end plate of the guide apparatus according to the present invention (third embodiment).
Figure 7B:
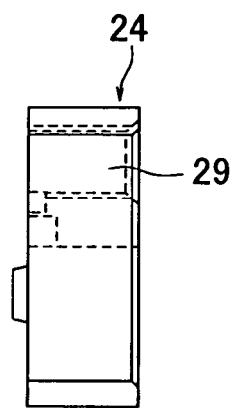
Figure 7C:
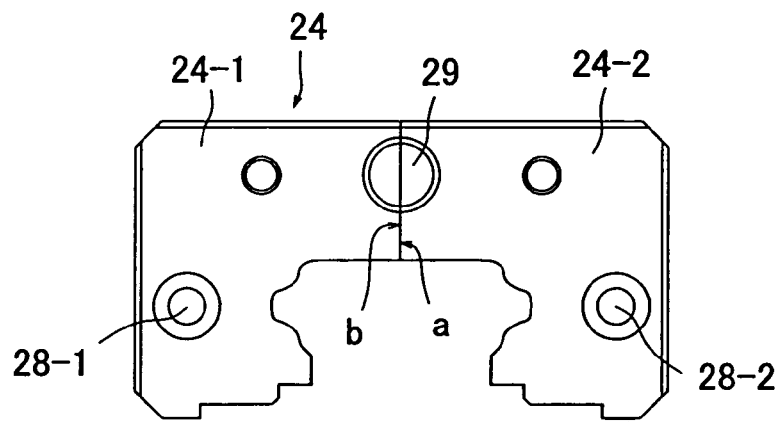
Figure 7D:
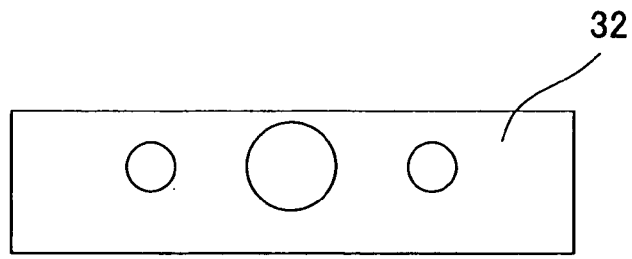

FIGS. 7A, 7B, 7C and 7D show still another structural example of the end plate 24. FIG. 7A is a plan view of the end plate 24 and a retaining member 32. FIG. 7B is a side view of the end plate 24. FIG. 7C is a front view of the end plate 24. FIG. 7D is a front view of the retaining member 32.

The end plate 24 is formed from a pair of split parts 24-1 and 24-2 that are splittable to left and right in the width direction at the opening of the end plate 24. The split parts 24-1 and 24-2 are provided with respective securing screw holes 28-1 and 28-2.

The retaining member 32 is made from a metal plate or the like. The retaining member 32 is bent at both ends thereof into a U-shape.

The split parts 24-1 and 24-2 are brought toward each other from both sides of the track rail 1 until their parting surfaces a and b contact and coincide with each other. In this state, the split parts 24-1 and 24-2 are fitted between the opposite ends of the retaining member 32, whereby the split parts 24-1 and 24-2 are positioned with respect to each other to form an end plate assembly.

In this state, the end plate assembly is secured to one end of the moving block body 21 by using securing screws passed through the securing screw holes 28-1 and 28-2.

Thus, the split parts 24-1 and 24-2 are positioned with respect to each other with high accuracy, and in this state they are secured to one end of the moving block body 21. Therefore, no displacement will occur during use, as in the case of the above-described first and second embodiments.

Although in this embodiment, the retaining member 32 is fitted to the end plate assembly from the front thereof, it should be noted that the retaining member 32 may be fitted to the end plate assembly from the back thereof or from thereabove.

Fourth Embodiment

Figure 8A:
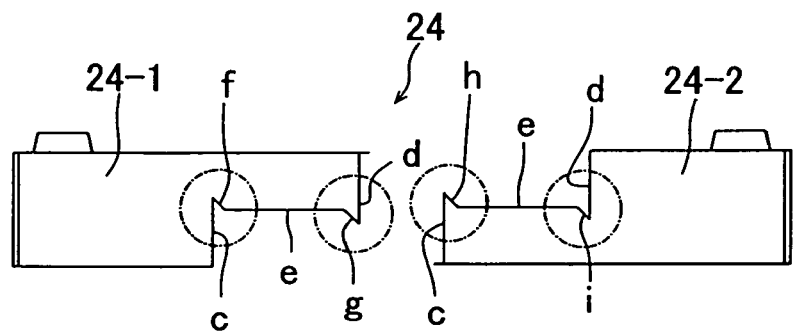
FIGS. 8A, 8B and 8C are diagrams showing a further structural example of the moving block end plate of the guide apparatus according to the present invention (fourth embodiment).
Figure 8B:
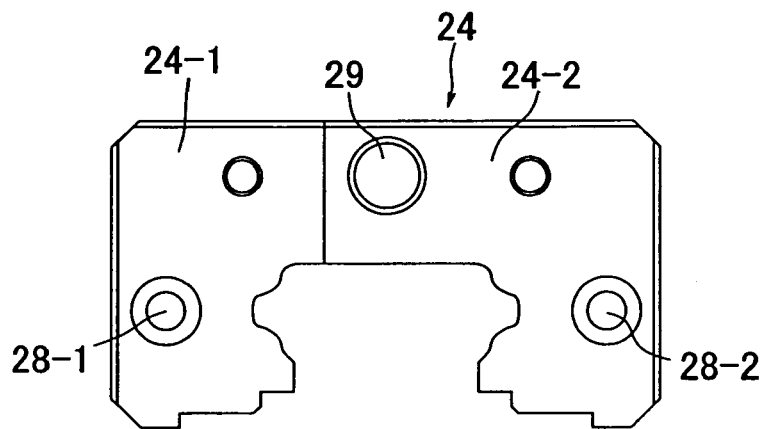
Figure 8C:
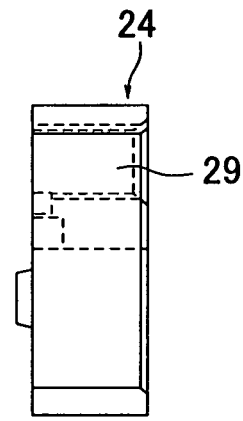

FIGS. 8A, 8B and 8C show a further structural example of the end plate 24. FIG. 8A is an exploded plan view. FIG. 8B is a front view. FIG. 8C is a side view.

The end plate 24 is formed from a pair of split parts 24-1 and 24-2 that are splittable to left and right at a parting surface consisting of axial surfaces (extending in the travel direction) c and d and widthwise surfaces e perpendicular to the axial direction.

A recess f is provided at the intersection of the axial surface c and the widthwise surface e of the split part 24-1, and a projection g is provided at the intersection of the axial surface d and the widthwise surface e of the split part 24-1. A projection h is provided at the intersection of the axial surface c and the widthwise surface e of the split part 24-2. The projection h is to be fitted into the recess f. A recess i is provided at the intersection of the axial surface d and the widthwise surface e of the split part 24-2. The recess i is to be fitted with the projection g.

When the split parts 24-1 and 24-2 are joined together so that their respective axial surfaces c, axial surfaces d and widthwise surfaces e contact and coincide with each other, the recess f and the projection h are fitted to each other, and so are the projection g and the recess i. Thus, the split parts 24-1 and 24-2 are positioned with respect to each other in a state where they are prevented from moving relative to each other in the width direction.

The split parts 24-1 and 24-2 are brought toward each other from both sides of the track rail 1 until their respective axial surfaces c, axial surfaces d and widthwise surfaces e contact and coincide with each other, whereby the recess f and the projection h are fitted to each other, and so are the projection g and the recess i, thereby forming an end plate assembly. Then, the end plate assembly is secured to one end of the moving block body 21 by using securing screws passed through the securing screw holes 28-1 and 28-2.

Thus, the split parts 24-1 and 24-2 are positioned with respect to each other with high accuracy, and in this state they are secured to one end of the moving block body 21. Accordingly, no displacement will occur during use, as in the case of the first to third embodiments.

It should be noted that the combination of surfaces at which the end plate 24 is splittable into the pair of split parts 24-1 and 24-2 is not necessarily limited to that in the above-described embodiment. Any structure may be used in which the split parts 24-1 and 24-2 have a recess and a projection that are fitted to each other when the split parts 24-1 and 24-2 are joined together in such a way that their surfaces contact and coincide with each other, thereby preventing the split parts 24-1 and 24-2 from moving relative to each other in the width direction.

Fifth Embodiment

Figure 9A:
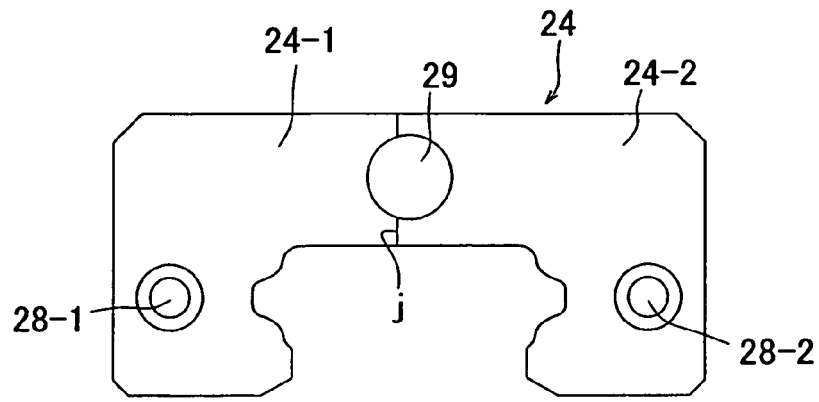
FIGS. 9A, 9B, 9C and 9D are diagrams showing a still further structural example of the moving block end plate of the guide apparatus according to the present invention (fifth embodiment).
Figure 9B:
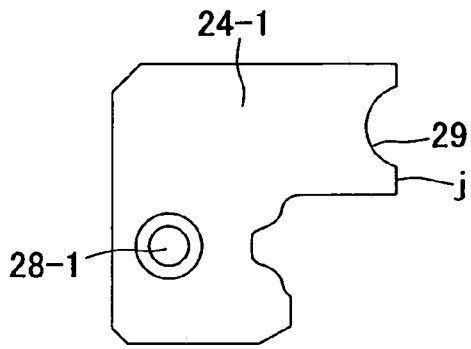
Figure 9C:
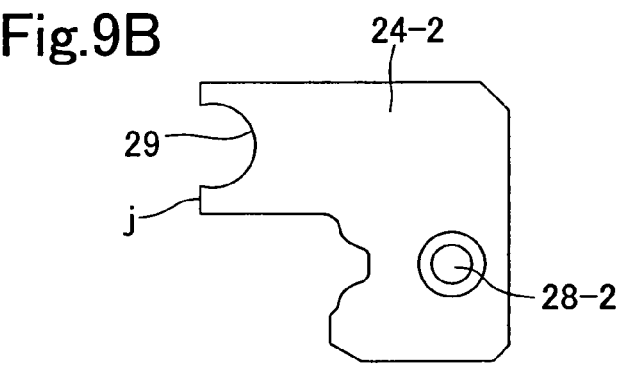

FIGS. 9A, 9B and 9C show a still further structural example of the end plate 24. FIG. 9A is a front view. FIG. 9B is a front view of one split part. FIG. 9C is a front view of the other split part.

As shown in FIG. 9A, an end plate 24 having an oil hole 29 is splittable into two at a parting surface j crossing the oil hole 29 at a position a predetermined distance away from the center of the oil hole 29. That is, the end plate 24 is formed from a pair of split parts 24-1 and 24-2 as shown in FIGS. 9B and 9C.

Figure 9D:
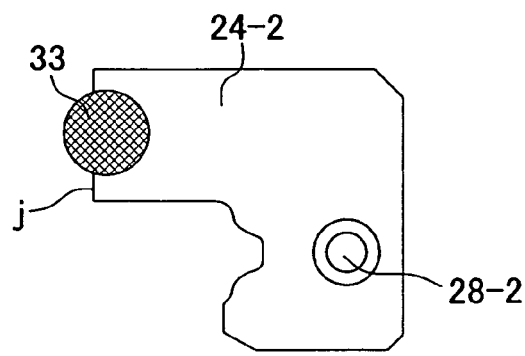

As shown in FIG. 9D, a columnar blank plug 33 is inserted into the oil hole 29 of the split part 24-2.

The split parts 24-1 and 24-2 are brought toward each other from both sides of the track rail 1 so that their respective parting surfaces j approach each other, whereby the oil hole 29 of the split part 24-1 is fitted to the blank plug 33 in the split part 24-2, and at the same time, the parting surfaces j are brought into coincidence with each other, thereby forming an end plate assembly.

The end plate assembly is secured to one end of the moving block body 21 by using securing screws passed through the securing screw holes 28-1 and 28-2.

Thus, the split parts 24-1 and 24-2 can be positioned with respect to each other with high accuracy, and in this state they are secured to one end of the moving block body 21. Therefore, no displacement will occur during use, as in the case of the first to fourth embodiments.

Sixth Embodiment

Figure 10:
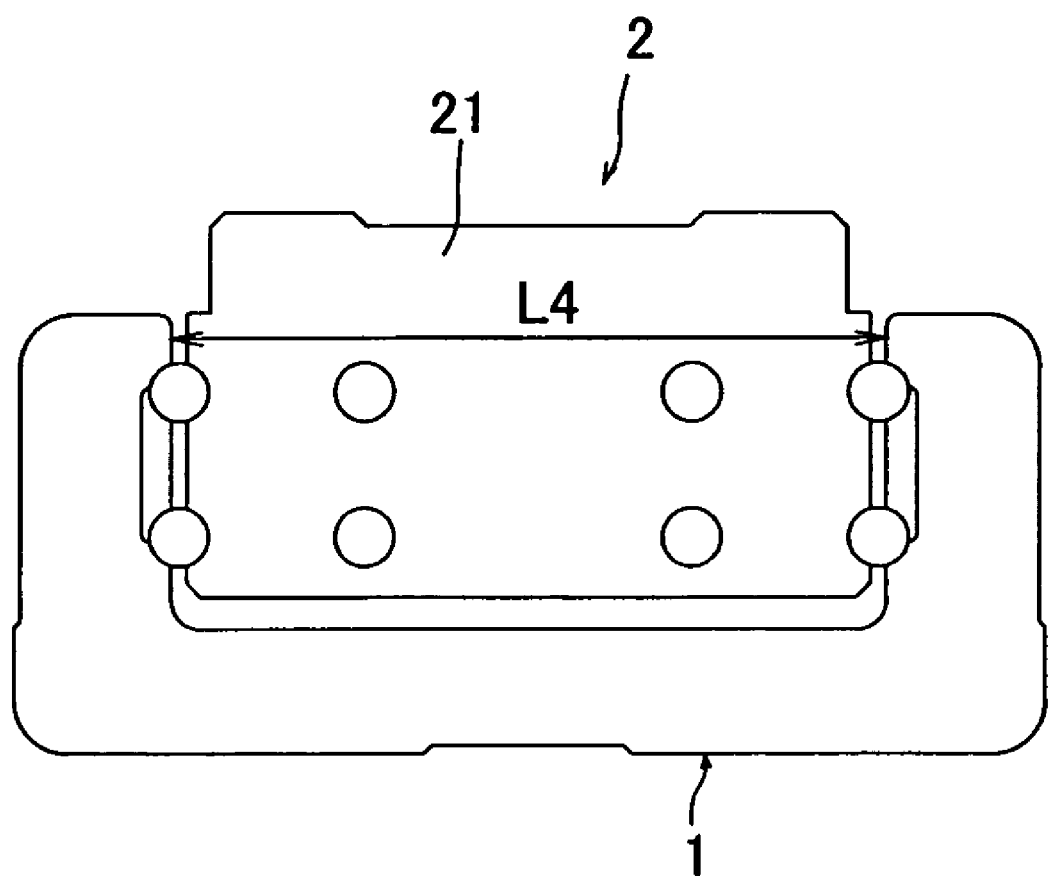
FIG. 10 is a sectional view showing another structural example of the guide apparatus according to the present invention (sixth embodiment).

In the first to fifth embodiments, the present invention has been described with regard to a guide apparatus in which the moving block 2 is assembled astride the track rail 1, by way of example. The present invention is, however, not necessarily limited to guide apparatus having such a structure. The present invention may also be applied to a guide apparatus in which, as shown in FIG. 10, a moving block 2 is assembled into the opening of a track rail 1 with a U-shaped sectional configuration.

That is, in this type of guide apparatus, the moving block body 21 per se can be assembled into the track rail 1 from thereabove, but end plates attached to both ends of the moving block body 21 in the travel direction have a width larger than the width L4 of the opening of the track rail 1.

Even in such a case, the moving block 2 can be easily assembled into the opening of the track rail 1 by using end plates each comprising a pair of split parts 24-1 and 24-2 arranged as shown in FIGS. 5A to 9D. That is, the split parts 24-1 and 24-2 are positioned with respect to each other in the opening of the track rail 1 and connected together into an end plate assembly. Thereafter, the end plate assembly is secured to one end of the moving block body 21. By doing so, the moving block 2 can be easily assembled into the track rail 1 at an intermediate part thereof even if the track rail 1 has an endless annular shape.

Seventh Embodiment

Figure 11:
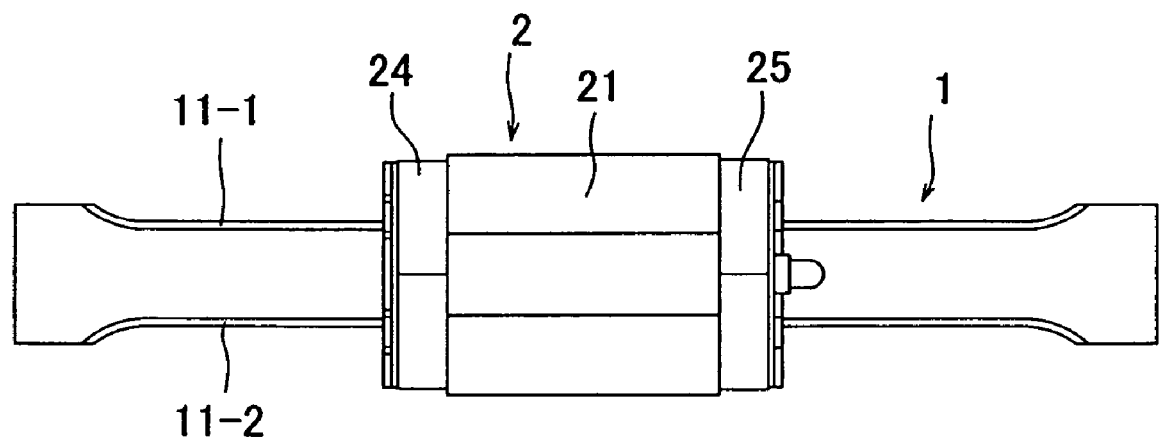
FIG. 11 is a diagram showing still another structural example of the guide apparatus according to the present invention (seventh embodiment).

FIG. 11 is a plan view showing still another structural example of the guide apparatus according to the present invention. As shown in the figure, the guide apparatus has a track rail 1 whose rolling element rolling grooves 11-1 and 11-2 (not shown) and rolling element rolling grooves 12-1 and 12-2 (not shown) turn uphill at both ends of the track rail 1.

In the guide apparatus having such a structure, a conventional moving block 2 cannot be assembled onto the track rail 1 from either end thereof.

Therefore, the moving block body 21 is arranged so that it can be assembled onto the track rail 1 from thereabove, as shown in FIG. 2. The end plates 24 and 25 are each formed from a pair of split parts 24-1 and 24-2 arranged as shown in FIGS. 5A to 9D. By doing so, the moving block 2 can be easily assembled onto the track rail 1.

Eighth Embodiment

Figure 12A:
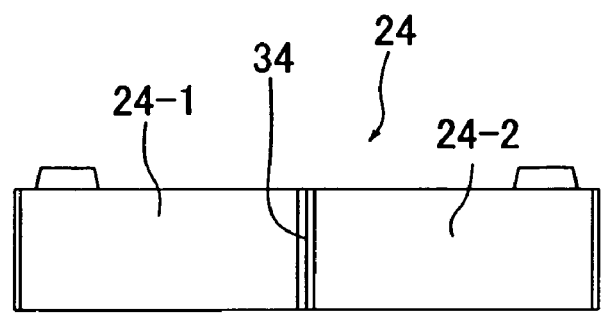
FIGS. 12A, 12B and 12C are diagrams showing a still further structural example of the moving block end plate of the guide apparatus according to the present invention (eighth embodiment).
Figure 12B:
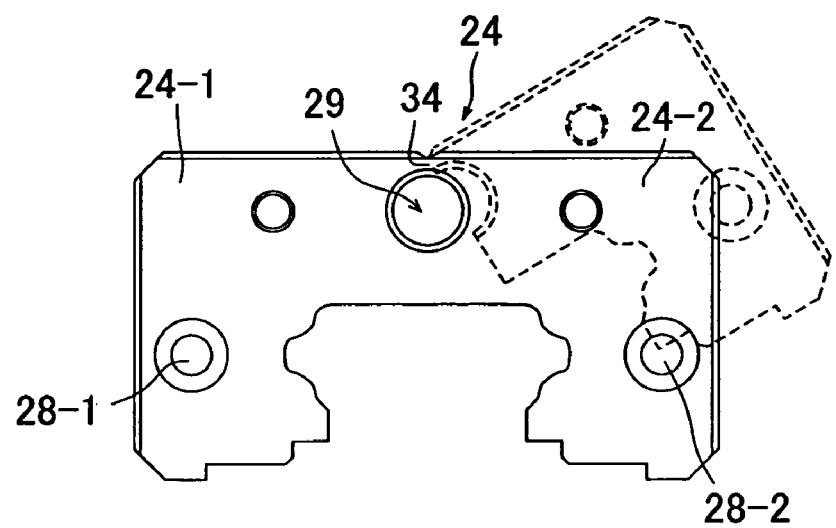
Figure 12C:
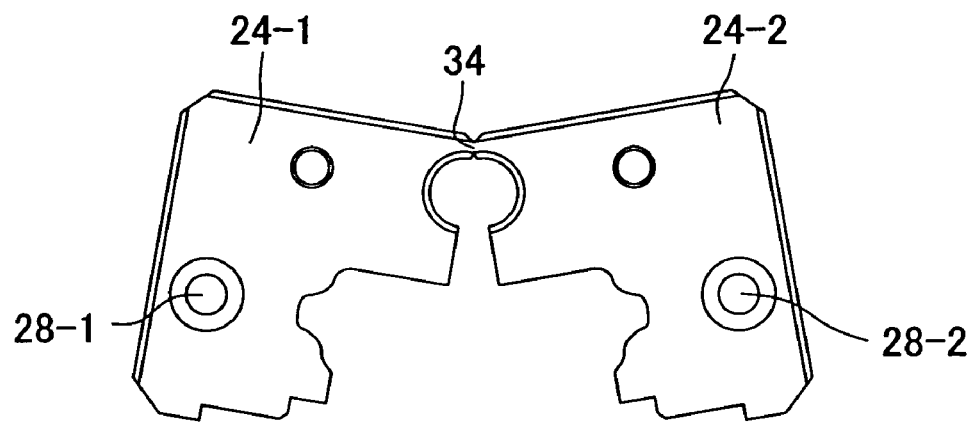

FIGS. 12A, 12B and 12C show a still further structural example of the end plate 24. FIG. 12A is a plan view. FIG. 12B is a front view. FIG. 12C is a front view showing the end plate in a state where the split parts are open.

As shown in the figures, the split parts 24-1 and 24-2 are partly connected to each other at a joint 34 so that the opening of the end plate 24 can be enlarged in the width direction.

The split parts 24-1 and 24-2 are provided with respective securing screw holes 28-1 and 28-2. The joint 34 is sufficiently elastic to allow the split parts 24-1 and 24-2 to rotate about the joint 34 so as to enlarge the opening of the end plate 24.

The split parts 24-1 and 24-2 of the end plate 24 are rotated clockwise and counterclockwise, respectively, about the joint 34 to enlarge the opening of the end plate 24 as shown in FIG. 12C. In this state, the end plate 24 is mounted astride the track rail 1. Thereafter, the split parts 24-1 and 24-2 are brought toward each other to form an end plate assembly. Then, the end plate assembly is secured to one end of the moving block body 21 by using securing screws passed through the securing screw holes 28-1 and 28-2.

Thus, the split parts 24-1 and 24-2 are positioned with respect to each other with high accuracy, and in this state they are secured to one end of the moving block body 21. Therefore, no displacement will occur during use, as in the case of the first to sixth embodiments.

Ninth Embodiment

Figure 13A:
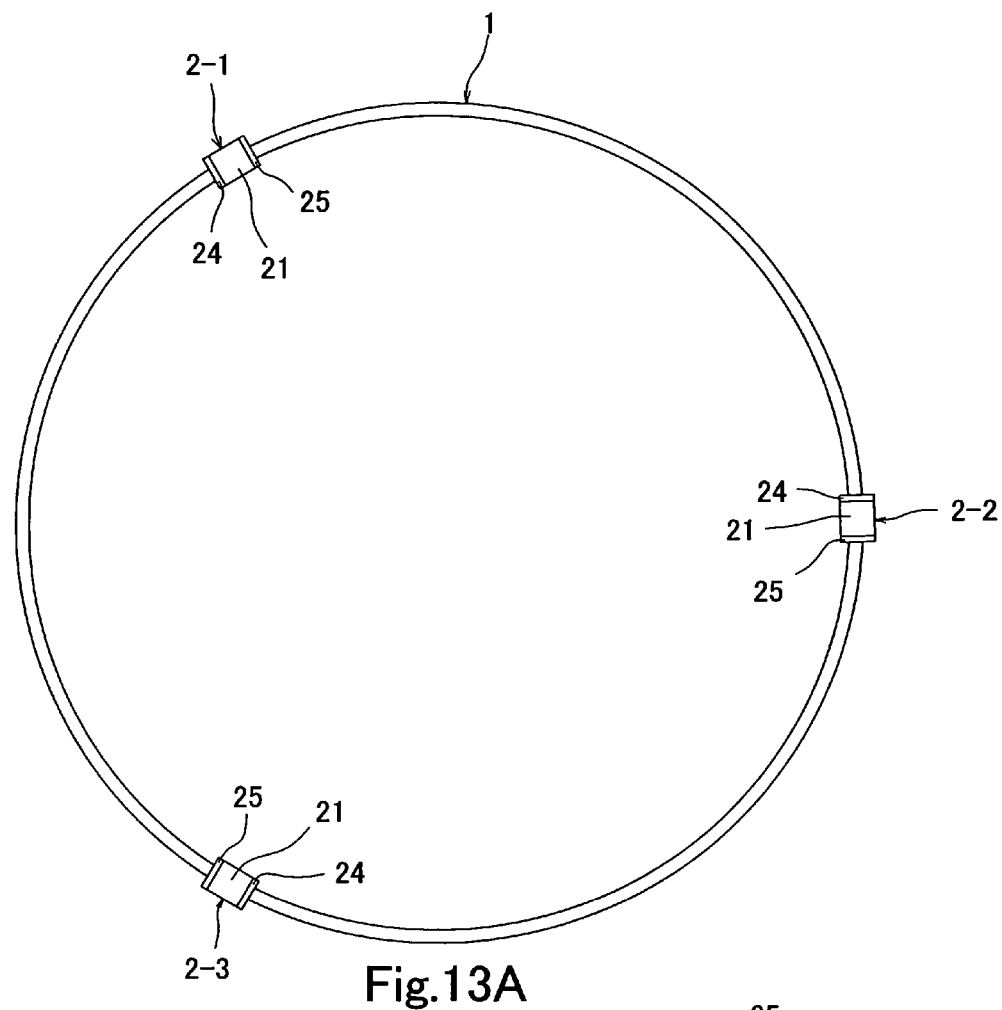
FIGS. 13A and 13B are diagrams showing a further structural example of the guide apparatus according to the present invention (ninth embodiment).
Figure 13B:
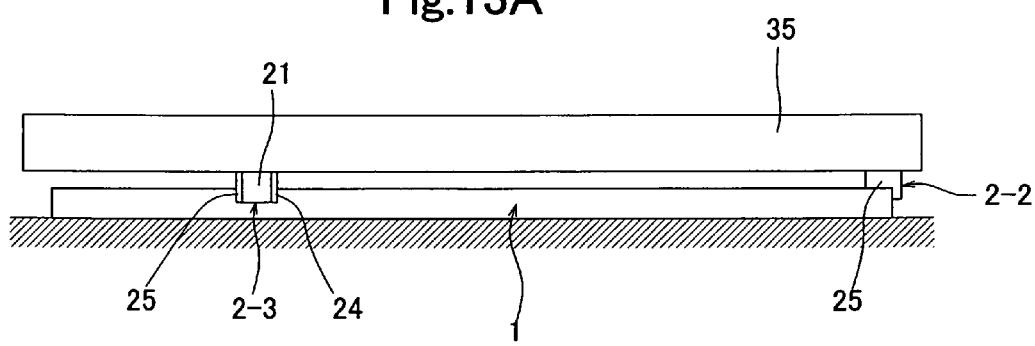

FIGS. 13A and 13B show a further structural example of the guide apparatus according to the present invention. FIG. 13A is a plan view of the guide apparatus in this embodiment. FIG. 13B is a side view of the guide apparatus as used in a rotary table system.

The guide apparatus in this embodiment differs from the guide apparatus shown in FIG. 1 in that, as shown in FIG. 13A, a plurality (three in the illustrated example) of moving blocks 2-1 to 2-3 are movably attached to an annular track rail 1.

The moving blocks 2-1 to 2-3 each use a moving block body 21 having the same structure as that shown in FIG. 2. End plates 24 and 25 secured to both axial ends of the moving block body 21 have the same structure as that of any of the structural examples shown in FIGS. 5A to 9D and 12A to 12C.

With the guide apparatus having the above-described structure, a rotary table system can be constructed by mounting a table 35 onto the moving blocks 2-1 to 2-3 as shown in FIG. 13B.

The rotary table system arranged as stated above can bear a load near the loading point and is therefore satisfactorily resistant to turning moment.

Tenth Embodiment

Figure 14A:
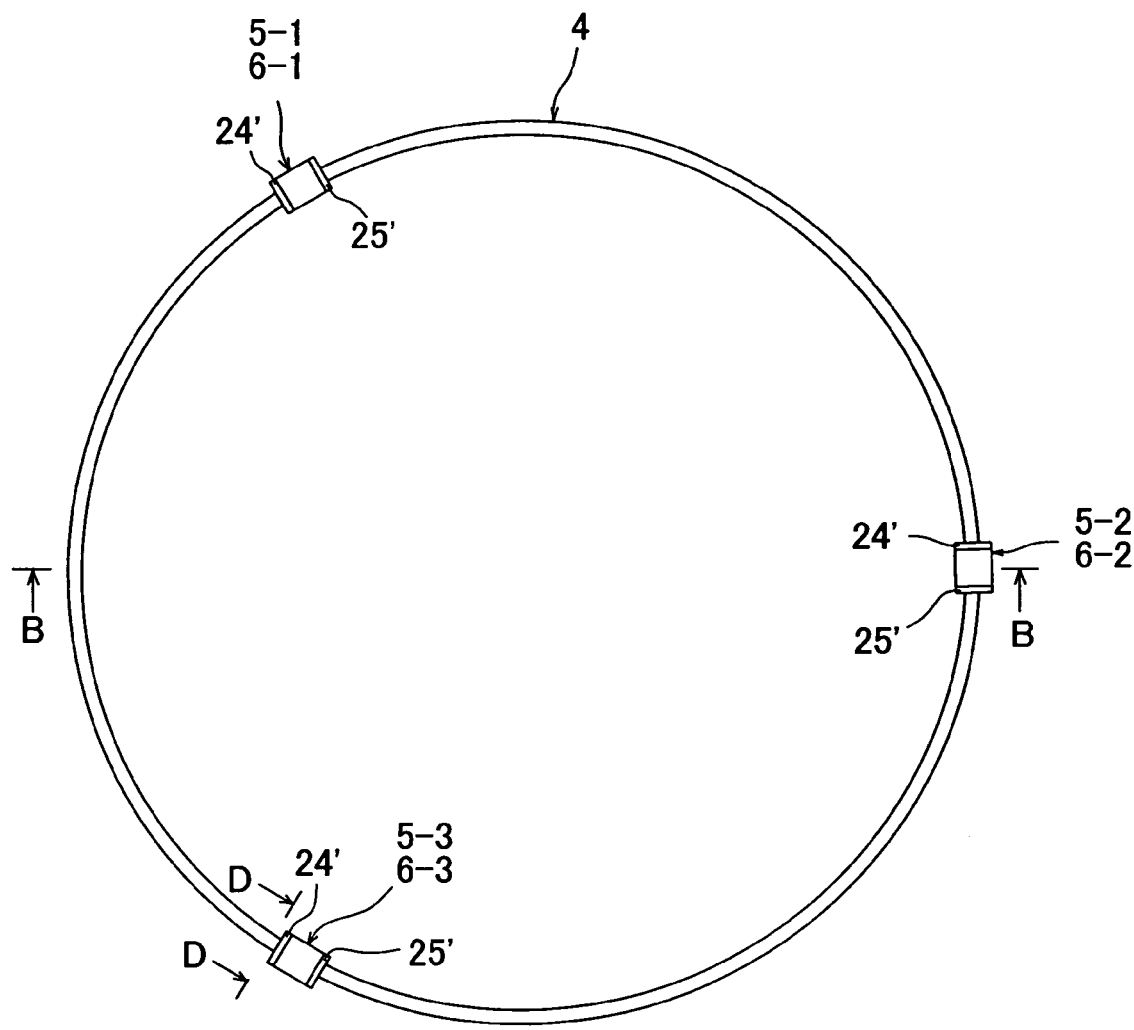
FIGS. 14A and 14B are diagrams showing a still further structural example of the guide apparatus according to the present invention (tenth embodiment).
Figure 14B:
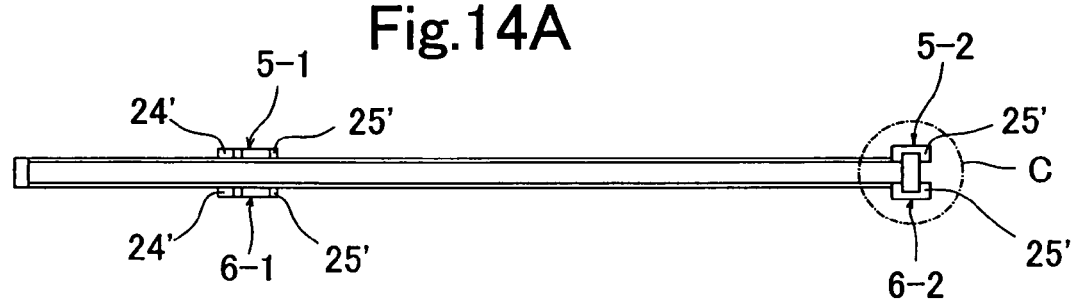
Figure 15:
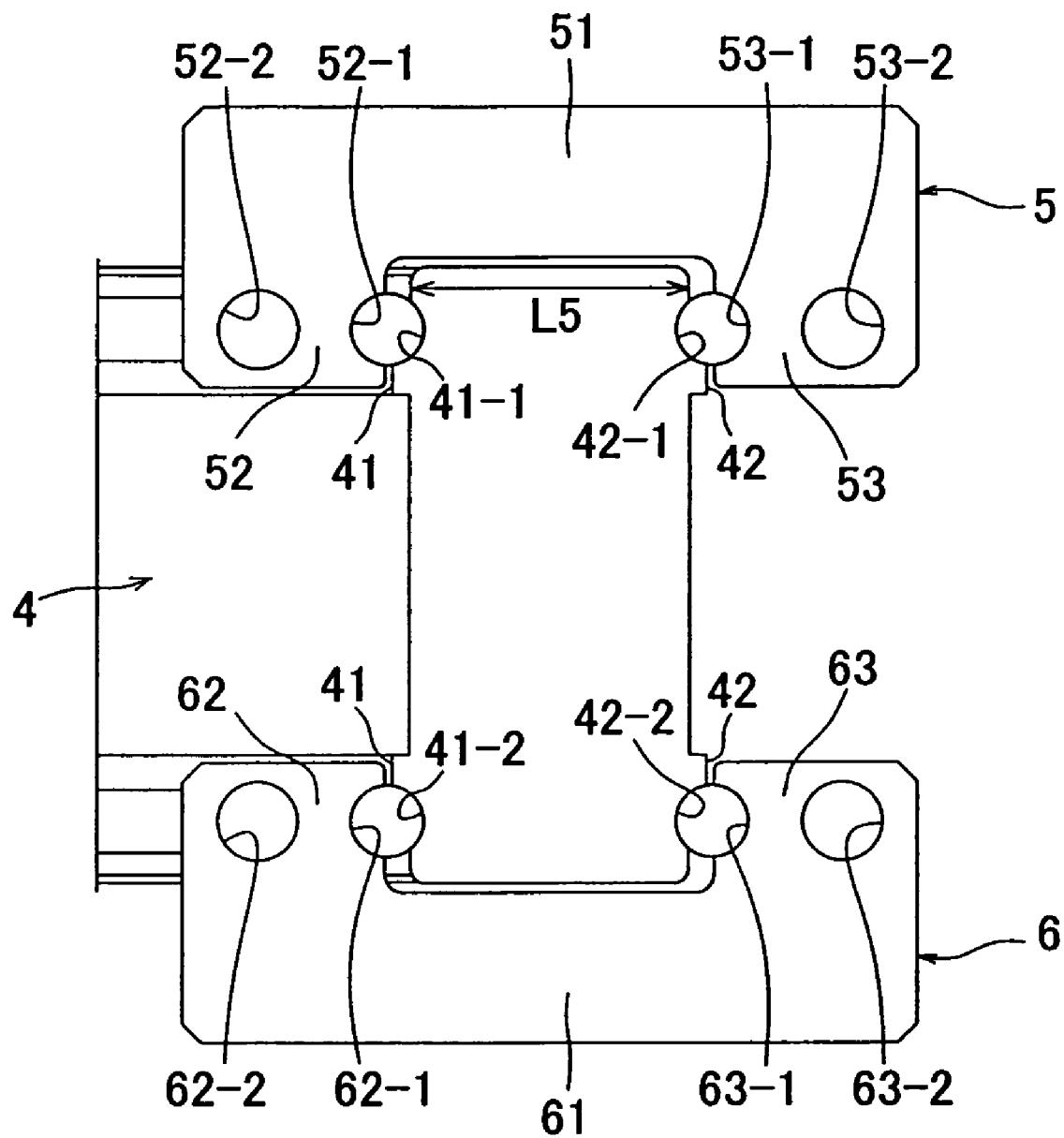
FIG. 15 is an enlarged view of part C in FIG. 14B.

FIGS. 14A, 14B and 15 show a still further structural example of the guide apparatus according to the present invention. FIG. 14A is a plan view of the guide apparatus in this embodiment. FIG. 14B is a sectional view taken along the line B-B in FIG. 14A. FIG. 15 is an enlarged view of part C of FIG. 14B.

The guide apparatus in this embodiment has an endless annular track rail 4 and a plurality (three in the illustrated example) of moving blocks 5 (6) movably attached to each of the upper and lower sides of the track rail 4.

The track rail 4 is approximately rectangular in a section perpendicular to the axial direction (i.e. the travel direction of the moving blocks). The track rail 4 has recesses in the respective centers of the left and right sides thereof. The track rail 4 has ridges 41 and 42 on the left and right sides of the top and bottom thereof.

Rolling element rolling grooves 41-1 and 41-2 along which rolling elements (balls in the illustrated example) roll are formed on the upper and lower ridges 41 on the left side (inner peripheral side) of the track rail 4, and rolling element rolling grooves 42-1 and 42-2 are formed on the upper and lower ridges 42 on the right side (outer peripheral side) of the track rail 4.

The moving block 5 has a moving block body 51 with a U-shaped sectional configuration as a main body thereof. The moving block body 51 has skirt portions 52 and 53 formed on the left and right sides thereof. The skirt portions 52 and 53 face each other across the opening of the U-shaped moving block body 51.

Similarly, the moving block 6 has a moving block body 61 with a U-shaped sectional configuration as a main body thereof. The moving block body 61 has skirt portions 62 and 63 formed on the left and right sides thereof. The skirt portions 62 and 63 face each other across the opening of the U-shaped moving block body 61.

The width of the opening of each of the moving block bodies 51 and 61 is larger than the width between the respective distal ends of the ridges 41 and 42 of the track rail 4. That is, the moving block bodies 51 and 61 can be assembled onto the track rail 4 from thereabove and from therebelow, respectively.

The inner surface of the skirt portion 52 of the moving block body 51 is provided with an axial rolling element rolling groove 52-1 facing opposite the rolling element rolling groove 41-1 of the track rail 4. The inner surface of the skirt portion 53 of the moving block body 51 is provided with an axial rolling element rolling groove 53-1 facing opposite the rolling element rolling groove 42-1 of the track rail 4.

The inner surface of the skirt portion 62 of the moving block body 61 is provided with an axial rolling element rolling groove 62-1 facing opposite the rolling element rolling groove 41-2 of the track rail 4. The inner surface of the skirt portion 63 of the moving block body 61 is provided with an axial rolling element rolling groove 63-1 facing opposite the rolling element rolling groove 42-2 of the track rail 4.

In addition, the skirt portions 52 and 53 of the moving block body 51 are provided with rolling element relief bores 52-2 and 53-2 associated with the rolling element rolling grooves 52-1 and 53-1, respectively. Similarly, the skirt portions 62 and 63 of the moving block body 61 are provided with rolling element relief bores 62-2 and 63-2 associated with the rolling element rolling grooves 62-1 and 63-1, respectively.

End plates 24' and 25' are provided at both ends of each of the moving block bodies 51 and 61 in the axial direction (travel direction) thereof. The end plates 24' and 25' have approximately the same structure as that of any of the structural examples shown in FIGS. 5A to 9D and 12A to 12C.

Eleventh Embodiment

Figure 16:
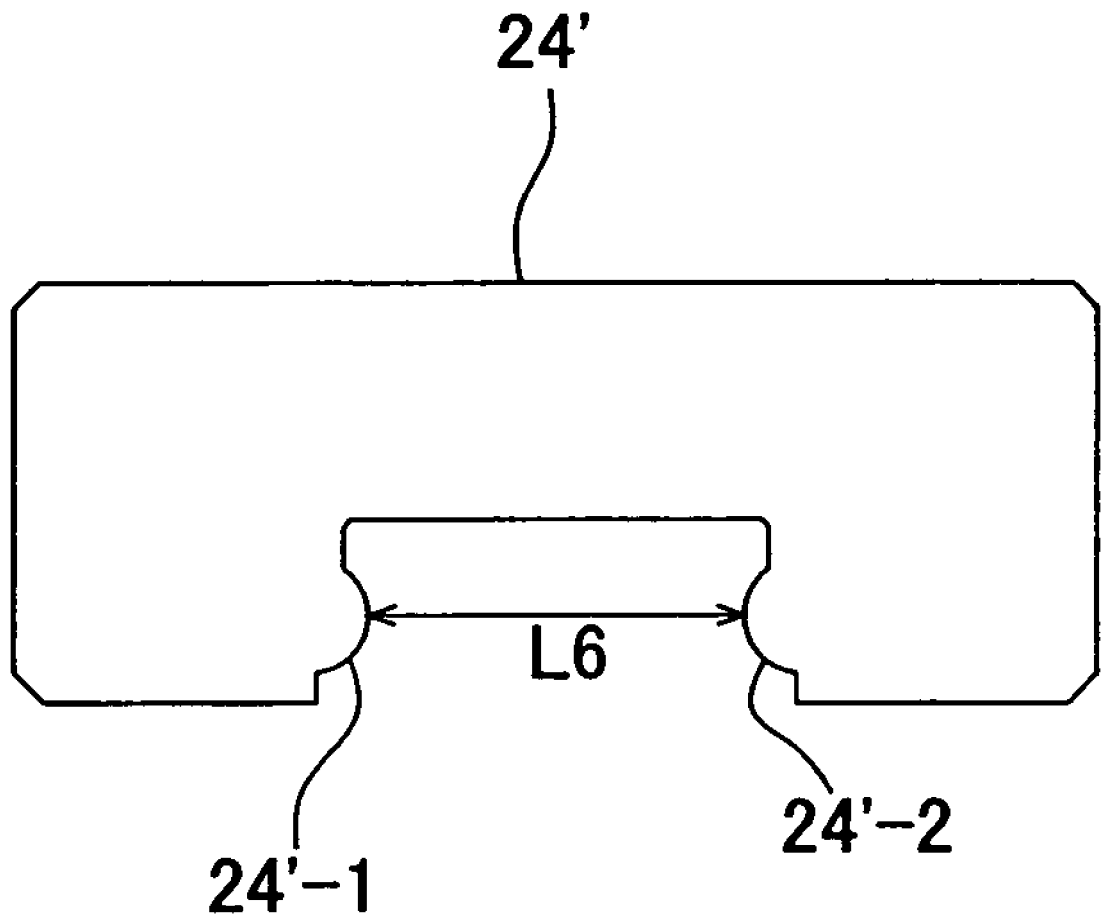
FIG. 16 is a diagram showing a still further structural example of the end plate of the guide apparatus according to the present invention (eleventh embodiment).

If an integrally formed end plate 24' as shown in FIG. 16 is used as each of the end plates 24' and 25' of the guide apparatus shown in FIGS. 14A to 15, the end plate 24' cannot be assembled onto the track rail 4 from thereabove because the spacing L6 between rolling element scooping projections 24'-1 and 24'-2 on the mutually opposing inner walls of the opening of the end plate 24' is smaller than the width L5 (see FIG. 15) of the upper end of the track rail 4 (L6<L5).

Figure 17:
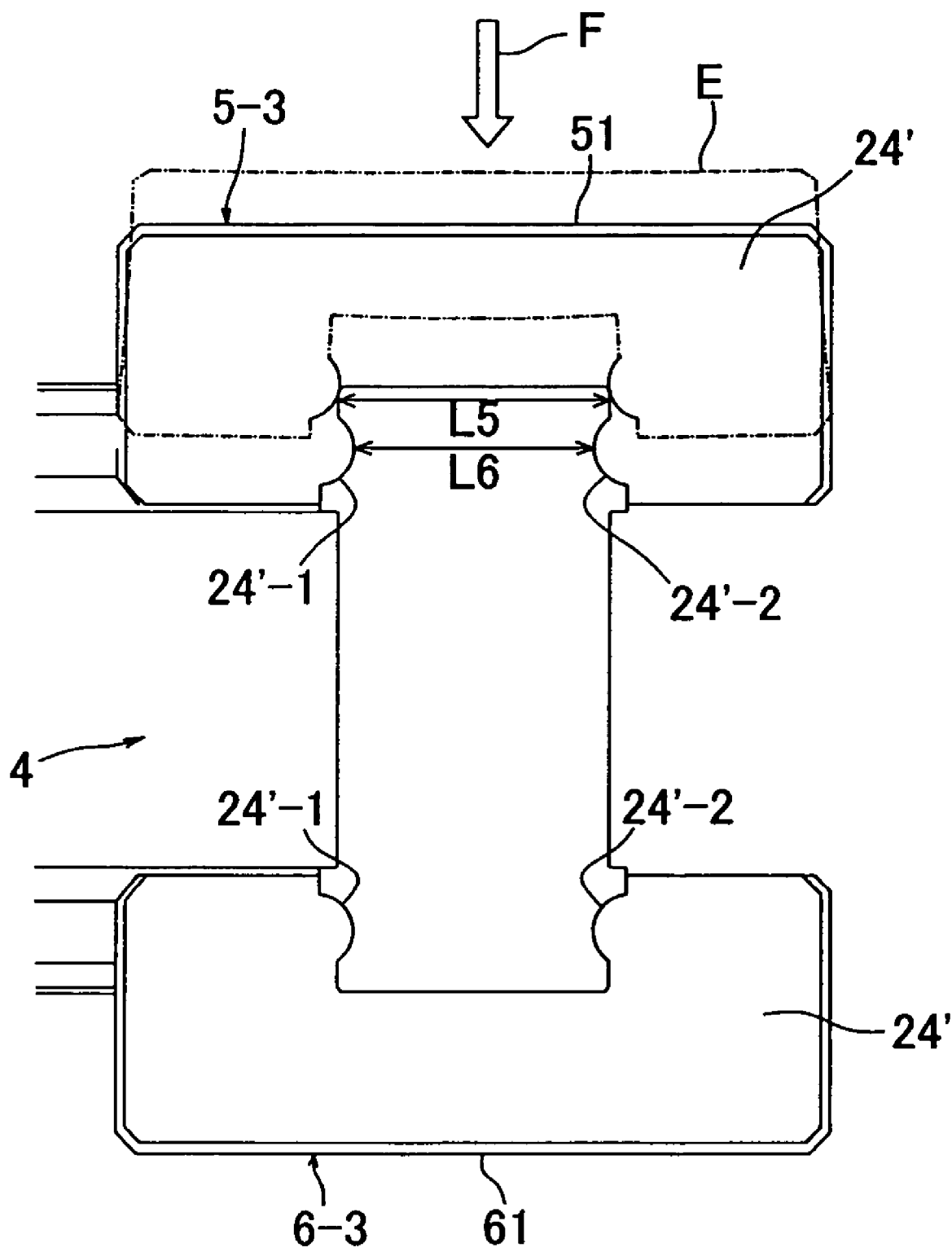
FIG. 17 is an enlarged sectional view as seen in the direction of the arrow D-D in FIG. 14A.

Therefore, the end plate 24' is formed from an elastic material, e.g. an elastic resin material. In assembly process, as shown in FIG. 17, the end plate 24' placed on the top of the track rail 4 is pressed in the direction indicated by the arrow F so that the track rail 4 will be fitted into the opening of the end plate 24'. Consequently, the end plate 24' is elastically deformed as shown by the dashed-and-dotted line E at a position where the projections 24'-1 and 24'-2 pass the upper end portion of the track rail 4. Thereafter, the end plate 24' is fitted in the position shown by the solid line.

More specifically, when the end plate 24' is fitted onto the track rail 4 from thereabove, the rolling element scooping projections 24'-1 and 24'-2 abut on the upper end of the track rail 4. When the end plate 24' is further pressed, the spacing between the projections 24'-1 and 24'-2 widens, as shown by the dashed-and-dotted line, to a sufficiently wide spacing (L5) to allow passage of the upper end of the track rail 4. Further pressing the end plate 24' enables the projections 24'-1 and 24'-2 of the end plate 24' to be fitted into the rolling element rolling grooves 41-1 and 42-1 of the track rail 4, as shown by the solid line. Thus, the end plate 24' is assembled onto the track rail 4.

As stated above, the end plate 24' of the guide apparatus is formed from an elastic material so that the portion of the opening that has the smallest width is expandable within the elastic deformation range to enable the upper end portion of the track rail 4 to pass therethrough, thereby allowing the end plate 24' to be readily assembled onto the track rail 4.

Thus, it becomes possible to assemble the end plates 24', which have a one-piece structure as shown in FIG. 16, onto the upper and lower sides of the track rail 4 as shown in FIG. 17.

It should be noted that FIG. 17 is an enlarged sectional view as seen in the direction of the arrow D-D in FIG. 14A. The end plates 25' can also be assembled onto the upper and lower sides of the track rail 4 by forming them from an elastic material as in the case of the end plates 24', although an illustration thereof is omitted.

Figure 18:
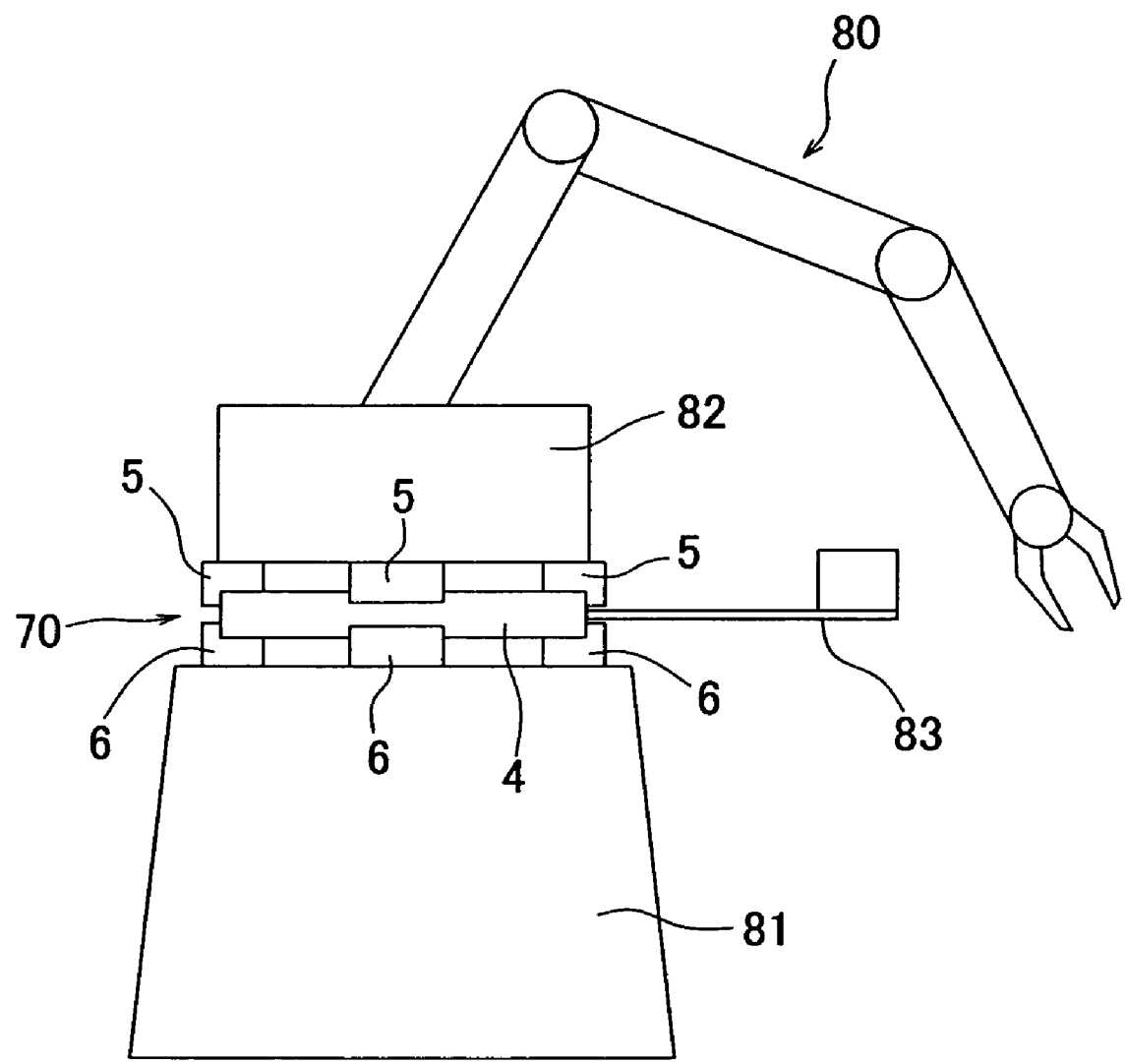
FIG. 18 is a diagram showing a structural example of a system using the guide apparatus according to the present invention.

FIG. 18 shows an example of use of a guide apparatus arranged as shown in FIGS. 14A to 15. As illustrated in the figure, a robot 80 is installed with a guide apparatus 70 interposed between bases 81 and 82. The guide apparatus 70 has a plurality of moving blocks 5 and 6 assembled onto the upper and lower sides of a track rail 4.

With this arrangement, the track rail 4 and the base 82 can swivel independently of each other. Accordingly, if a tool table 83, for example, is attached to the track rail 4, tools or the like can be changed without rotating the arm of the robot 80.

If the robot 80 and the tool table 83 are rotated toward each other, the tool change time can be reduced.

The present invention is not necessarily limited to the above-described embodiments but can be modified in a variety of ways. For example, although the balls 3 are used as the rolling elements in the foregoing embodiments, the rolling elements are not necessarily limited to balls but may be rollers.

What we claim is:

1. A guide apparatus comprising:
a track rail having a longitudinally extending rolling element rolling surface; and
a moving block relatively movably attached to said track rail;
said moving block having:
a moving block body having a load rolling element rolling surface that forms a load rolling element rolling passage in cooperation with said rolling element rolling surface, said moving block body further having a rolling element relief bore associated with said load rolling element rolling surface;
an end plate attached to each end of said moving block body in a direction of relative movement of said moving block, said end plate having a rolling element direction change passage that forms a rolling element recirculation passage in cooperation with said load rolling element rolling passage and rolling element relief bore; and
a plurality of rolling elements disposed in said rolling element recirculation passage so as to recirculate in response to relative movement of said track rail and moving block;
wherein said moving block body has in a section perpendicular to an axial direction a geometry that allows said moving block body to be assembled to said track rail at an intermediate part of said track rail;
said end plate consisting essentially of a pair of split parts that are splittable to right and left in a width direction of said end plate;
wherein the split parts of said end plate are connected to each other into an end plate assembly with a high positioning accuracy by connecting means, and said end plate assembly is secured to one end of said moving block body in the direction of relative movement by securing means.

2. A guide apparatus according to claim 1, wherein said connecting means comprises:
   a positioning pin projecting from a parting surface of one of the split parts of said end plate; and
   a positioning hole fittable with said positioning pin, said positioning hole being provided in a parting surface of the other of said split parts;
   wherein said positioning pin is fitted into said positioning hole to form said end plate assembly;
   said securing means comprising:
   securing screws; and
   securing screw holes respectively provided in the split parts of said end plate;
   wherein said securing screws are passed through said securing screw holes to secure said end plate assembly to one end of said moving block body in the direction of relative movement.

3. A guide apparatus according to claim 2, wherein said track rail has an endless annular shape.

4. A guide apparatus according to claim 2, wherein said track rail has the rolling element rolling surface that turns uphill at both ends thereof.

5. A guide apparatus according to claim 1, wherein said connecting means comprises:
   positioning holes provided in the split parts of said end plate at respective positions a predetermined distance away from respective parting surfaces of said split parts; and
   a positioning member bent at both ends thereof into a U-shape so that both end portions of said positioning member are fittable into said positioning holes, respectively;
   wherein said split parts are brought into contact with each other so that the parting surfaces coincide with each other, and both end portions of said positioning member are fitted into the respective positioning holes of the said split parts to form said end plate assembly;
   said securing means comprising:
   securing screws; and
   securing screw holes respectively provided in the split parts of said end plate;
   wherein said securing screws are passed through said securing screw holes to secure said end plate assembly to one end of said moving block body in the direction of relative movement.

6. A guide apparatus according to claim 5, wherein said track rail has an endless annular shape.

7. A guide apparatus according to claim 5, wherein said track rail has the rolling element rolling surface that turns uphill at both ends thereof.

8. A guide apparatus according to claim 1, wherein said connecting means comprises:
   a retaining member bent at both ends thereof into a U-shape;
   wherein said split parts are brought into contact with each other so that parting surfaces of said split parts coincide with each other, and in this state said split parts are fitted between opposite end portions of said retaining member to form said end plate assembly;
   said securing means comprising:
   securing screws; and
   securing screw holes respectively provided in the split parts of said end plate;
   wherein said securing screws are passed through said securing screw holes to secure said end plate assembly to one end of said moving block body in the direction of relative movement.

9. A guide apparatus according to claim 8, wherein said track rail has an endless annular shape.

10. A guide apparatus according to claim 8, wherein said track rail has the rolling element rolling surface that turns uphill at both ends thereof.

11. A guide apparatus according to claim 1, wherein said connecting means comprises:
    a recess and a projection provided on respective parting surfaces of the split parts of said end plate, said recess and projection being fittable to each other to prevent said split parts from moving relative to each other in the width direction;
    wherein said split parts are joined together so that said parting surfaces coincide with each other and said recess and projection are fitted to each other, thereby forming said end plate assembly;
    said securing means comprising:
    securing screws; and
    securing screw holes respectively provided in the split parts of said end plate;
    wherein said securing screws are passed through said securing screw holes to secure said end plate assembly to one end of said moving block body in the direction of relative movement.

12. A guide apparatus according to claim 11, wherein said track rail has an endless annular shape.

13. A guide apparatus according to claim 11, wherein said track rail has the rolling element rolling surface that turns uphill at both ends thereof.

14. A guide apparatus according to claim 1, wherein said connecting means comprises:
    a blank plug provided in one of the split parts of said end plate such that a part of said blank plug projects from a parting surface of the one of said split parts; and
    a recess provided in a parting surface of the other of said split parts, said recess being fittable with the projecting part of said blank plug;
    wherein said split parts are joined together so that the parting surfaces coincide with each other and the projecting part of said blank plug is fitted into said recess, thereby forming said end plate assembly;
    said securing means comprising:
    securing screws; and
    securing screw holes respectively provided in the split parts of said end plate;
    wherein said securing screws are passed through said securing screw holes to secure said end plate assembly to one end of said moving block body in the direction of relative movement.

15. A guide apparatus according to claim 14, wherein said track rail has an endless annular shape.

16. A guide apparatus according to claim 14, wherein said track rail has the rolling element rolling surface that turns uphill at both ends thereof.

17. A guide apparatus according to claim 1, wherein said end plate has an approximately U-shaped configuration in a section perpendicular to the axial direction and is assembled astride said track rail;
    said connecting means comprising:
    said split parts that are partly connected to each other at a joint;
    wherein said split parts are rotated about the joint so as to enlarge an opening of said end plate in the width direction, and in this state said end plate is assembled astride said track rail to form said end plate assembly;
    said securing means comprising:
    securing screws; and securing screw holes respectively provided in the split parts of said end plate;

wherein said securing screws are passed through said securing screw holes to secure said end plate assembly to one end of said moving block body in the direction of relative movement.

18. A guide apparatus according to claim 17, wherein said track rail has an endless annular shape.

19. A guide apparatus according to claim 17, wherein said track rail has the rolling element rolling surface that turns uphill at both ends thereof.

20. A guide apparatus according to claim 1, wherein said track rail has an endless annular shape.

21. A guide apparatus according to claim 1, wherein said track rail has the rolling element rolling surface that turns uphill at both ends thereof.

22. A guide apparatus comprising:

a track rail having a longitudinally extending rolling element rolling surface; and a moving block relatively movably attached to said track rail;

said moving block having:

a moving block body having a load rolling element rolling surface that forms a load rolling element rolling passage in cooperation with said rolling element rolling surface, said moving block body further having a rolling element relief bore associated with said load rolling element rolling surface;

an end plate attached to each end of said moving block body in a direction of relative movement of said moving block, said end plate having a rolling element direction change passage that forms a rolling element recirculation passage in cooperation with said load rolling element rolling passage and rolling element relief bore; and a plurality of rolling elements disposed in said rolling element recirculation passage so as to recirculate in response to relative movement of said track rail and moving block;

wherein said moving block body has in a section perpendicular to an axial direction a geometry that allows said moving block body to be assembled to said track rail at an intermediate part of said track rail;

said end plate having an approximately U-shaped configuration in a section perpendicular to the axial direction, wherein an opening of said end plate has under normal conditions a width with which said end plate cannot be assembled onto said track rail at an intermediate part of said track rail, said end plate being formed from a material with which the width of an opening of said end plate is expandable by elastic deformation to allow said end plate to be assembled astride said track rail;

wherein after being assembled onto said track rail, said end plate is secured to one end of said moving block body in the direction of relative movement by securing means.

* * * * *